United States Patent
Völcker et al.

[19]

[11] Patent Number: 6,019,599
[45] Date of Patent: Feb. 1, 2000

[54] SUCTION SYSTEM FOR THE LASER PROCESSING OF WORK PIECES IN DENTAL TECHNOLOGY

[75] Inventors: Alexander Völcker, Rodenbach; Stephan Geiger, Prittlbach, both of Germany

[73] Assignee: Degussa-Hüls Aktiengesellschaft, Frankfurt, Germany

[21] Appl. No.: 09/129,867

[22] Filed: Aug. 6, 1998

[30] Foreign Application Priority Data

Aug. 8, 1997 [DE] Germany .......................... 197 34 294

[51] Int. Cl.[7] ........................................... A61C 1/00
[52] U.S. Cl. .................................. 433/29; 433/91; 606/10
[58] Field of Search ...................... 433/91, 29; 606/10, 606/13

[56] References Cited

U.S. PATENT DOCUMENTS

| | | | |
|---|---|---|---|
| 4,850,352 | 7/1989 | Johnson | 606/13 |
| 4,971,034 | 11/1990 | Doi et al. | 606/10 |
| 5,199,944 | 4/1993 | Cosmescu | 606/10 |
| 5,336,215 | 8/1994 | Hsueh et al. | 606/10 |
| 5,431,650 | 7/1995 | Cosmescu | 606/13 |
| 5,785,703 | 7/1998 | Goodman et al. | 606/10 |

FOREIGN PATENT DOCUMENTS

| | | |
|---|---|---|
| 3923829 | 1/1991 | Germany . |
| 3923829 | 4/1993 | Germany . |

*Primary Examiner*—John J. Wilson
*Attorney, Agent, or Firm*—Smith, Gambrell & Russell, LLP

[57] ABSTRACT

A suction system in a laser device for the bonding of prosthesis parts in dental technology formed of an annular suction nozzle that concentrically surrounds the laser focusing unit or an annular nozzle encircling the latter for the introduction of protective inert gas. The lower rim of the laser focusing unit or the annular nozzle for the supply of protective gas projects beyond the annular suction nozzle by 10 to 25 mm.

6 Claims, 1 Drawing Sheet

SUCTION SYSTEM FOR THE LASER PROCESSING OF WORK PIECES IN DENTAL TECHNOLOGY

INTRODUCTION AND BACKGROUND

The present invention relates to the laser welding in the field of dental technology, and more particularly, to a combined gas deliuery and suction system in devices for the laser processing of work pieces in the field of dental technology, especially for bonding prosthesis parts. The suction system serves to exhaust and remove the protective inert gas that is necessary for these operations, and for the elimination of the reaction products formed during the processing of the work pieces. In more particular detail, the suction unit operates with a protective inert gas which is supplied and introduced directly via an annular nozzle concentrically surrounding the conical laser focusing unit.

In the last few years, a large amount of bonding work in dental technology and other technical areas has been carried out by means of laser welding. Such laser apparatuses are state of the art and their structure and operation are known in the dental industry.

The processing of work pieces by means of laser beams normally takes place in the presence of a protective or inert gas. This protective gas can, for example, be supplied directly by way of the conical laser focusing unit or by the annular nozzle which concentrically surrounds the conical laser focusing unit. The inert gas performs the task of protecting the work piece against oxidation during laser processing. During processing, mostly gaseous and solid reaction products are formed, which, in part, can be reactive or even toxic, and therefore must be purposefully removed with the protective gas. These are matters well understood in the art.

In German OLS No. 3,800,050, the tool is surrounded by an annular suction channel for the removal of powdery processing waste. The suction channel, in turn, is surrounded by an annular nozzle which functions to blow compressed air in a vertical direction to the work piece, so that a gas curtain is produced, which is intended to prevent the exiting of the processing waste. In this way, one can eliminate powdery processing wastes but not, however, the supplied protective gas and the gaseous and vaporous reaction products formed during laser processing, since turbulence occurs in the suction channel, which could lead to a possible condensation of the reaction products.

German Patent No. 3,923,829 describes a suction system for the removal of the reaction products formed during the processing of work pieces by means of laser beams. The suction system consists of a laser focusing unit, within which a protective gas can be supplied. A suction hood with several openings, by means of which the reaction products can be suctioned off, is affixed in a gas-tight manner to the conically tapered end of the focusing unit. However, even here turbulence arising in the conduction of the gas cannot be avoided. Furthermore, this system is designed for processing planar work pieces. Its configuration precludes the processing of small work piece components such as those necessary in dental technology, especially manipulations in the laser processing field.

In DE 2,950,457 there is described a laser processing device, in the conical focusing unit of which air or gas is blown in tangentially. In that way, a twist is imparted to the gaseous stream, so that it passes through this unit in the manner of a tornado. The gas is then exhausted through an annular nozzle concentrically surrounding the focusing unit. This construction has the exclusive function of protecting the laser lens from contamination. The turbulent flow unavoidably generated in the area of the focused laser beam is not capable of protecting the work pieces from oxidation, even in the case of using an inert gas.

It is therefore an object of the present invention to develop a suction system in devices for the laser processing of work pieces in dental technology, for the removal of the protective gas employed in such processing, and for the elimination of reaction products formed during the processing of the work pieces which avoids the turbulence problems in prior known devices.

It is a further object of the present invention to develop a system for laser processing in dental technology which operates by supplying a protective gas by means of an annular nozzle concentrically surrounding the conical laser focusing unit and wherein the suctioning of gas and reaction products should take place in a laminar gas flow condition without disturbing components in the work area.

SUMMARY OF THE INVENTION

The above and other objects of the invention are attained by a suction system that comprises an annular nozzle, which concentrically surrounds the laser focusing unit for the supply of protective inert gas, wherein the lower edge of the laser focusing unit projects beyond the lower edge of the annular nozzle for the removal of the reaction products and the protective inert gas by a distance of 10 to 25 mm.

Another embodiment of the invention is a suction system wherein a first annular nozzle concentrically surrounds a second annular nozzle for the supply of protective gas which in turn concentrically surrounds the laser focusing unit. In this embodiment the lower edge of the second annular nozzle extends 10 to 25 mm beyond the lower edge of the annular nozzle for the removal of the reaction products and the protective inert gas.

By means of this special construction of the suction system, a turbulence-free, laminar gas flow is established in the work plane, without requiring special buffers. By proper and adequate separation of the system from the object being subjected to laser processing, essential and necessary manipulations can be carried out.

Advantageously, the nozzle cross section of each of the annular nozzles is 8 to 11 mm for the establishing of a steady-state laminar gas flow of 5 to 25 L/min.

BRIEF DESCRIPTION OF DRAWINGS

The present invention will be further understood with reference to the accompanying drawings, wherein.

DETAILED DESCRIPTION OF INVENTION

According to the detailed description, the suction system of the present invention is used in a state of the art device for the laser processing of work pieces, in particular, for the soldering of prosthesis parts in dental technology. As is known in the art, such devices require the presence of a protective or inert gas. The suction unit of this invention functions to remove the protective gas and for the elimination of the reaction products formed during the processing of the work pieces. In such devices the protective gas is supplied by way of an annular nozzle that concentrically surrounds the conical laser focusing unit. This annular nozzle is therefore also conically shaped.

In a first embodiment, the suction system of the invention features an annular nozzle that concentrically surrounds the laser focusing unit and functions as a suction nozzle for the removal of the protective gas and the reaction products. The annular nozzle can also be conically shaped but need not conform precisely to the contour of laser focusing unit. In this embodiment, the lower edge of the laser focusing unit projects beyond the lower edge of the annular nozzle for the removal of the protective gas and the reaction products by a length of 10 to 25 mm in the vertical direction.

In a second embodiment, a first annular nozzle concentrically surrounds a second annular nozzle for the supply of the protective gas and the second annular nozzle, in turn concentrically surrounds the laser focusing unit. In this embodiment the lower edge of the second annular nozzle for the introduction of the inert gas extends from 10 to 25 mm beyond the lower edge of the first annular nozzle which functions as the suction nozzle for the removal of the reaction products and the inert gas.

In a preferred aspect of the invention, the nozzle cross sections of the two annular nozzles are 8 to 11 mm such that the first nozzle can be accommodated within the second nozzle.

The supply of the protective gas and the suction removal take place from the same direction and thus do not block other spatial areas which are available, without restrictions, to the processing object. The suction removal effect achieved by the present invention is very efficient because with the separation of the device from the working plane that is available for the necessary manipulations carried out in laser processing, sufficient protection of the work piece against oxidation is possible together with extensive laminar flow of the inert protective gas.

Figure 1:
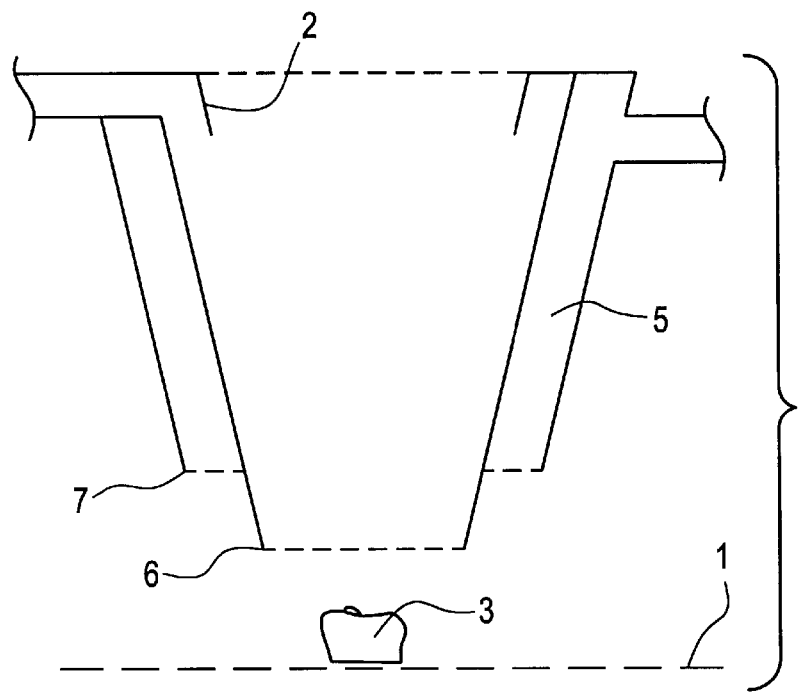
FIG. 1 is a schematic cross-section of one embodiment of the suction system of the invention.

Referring now to the accompanying drawings, FIG. 1 is a schematic cross-section of one embodiment of the invention and shows a unit including a laser beam focusing unit (2) which focuses on the work piece such as a tooth crown (3) located on the working plane (1). The protective gas flows through the focusing unit (2) which is concentrically surrounded by an annular nozzle (5) which is for removing the inert gas and the reaction products. The lower edge (6) of the laser focusing unit (2) extends below the lower edge of the annular nozzle 5 by 10 to 25 mm.

Figure 2:
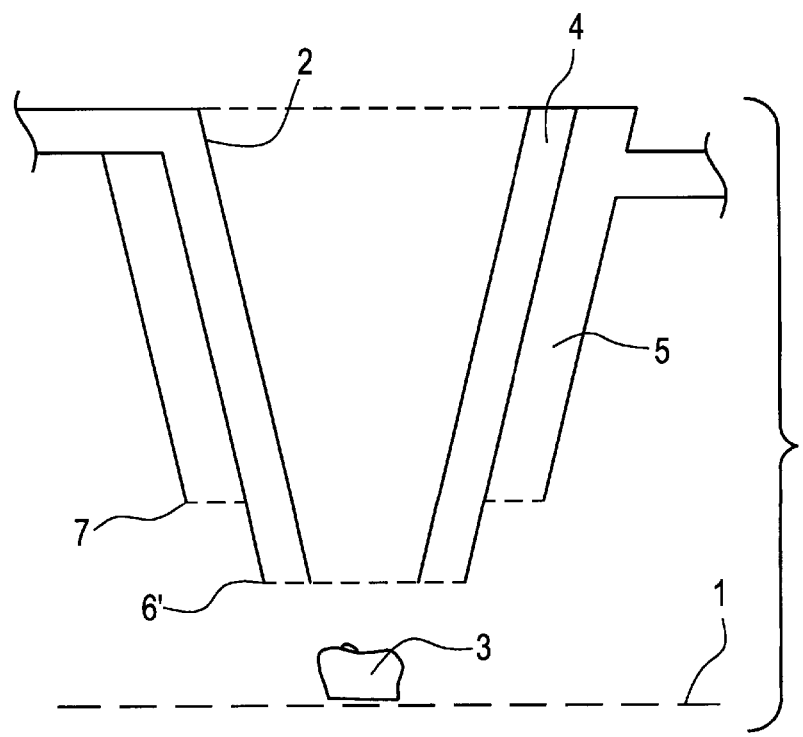
FIG. 2 is a schematic cross-section of a second embodiment of the invention.

FIG. 2 shows a second embodiment of the invention. In this second embodiment, the laser beam is conducted to the object (3) located in the work plane (1) by a focusing unit (2). A first conical annular nozzle (5) for exhausting the protective gas and the reaction products forms the outside jacket of the system. This first conical annular nozzle (5) functions for the removal of the protective gas and the reaction products formed in the course of the laser processing. A second annular nozzle (4) surrounds the laser focusing unit (2) and supplies the protective inert gas. The lower edge (6') of the second conical annular nozzle (4) projects beyond the lower edge (7) of the first annular conical nozzle (5) by a distance of 10 to 25 mm. The nozzles (4,5) are fixed with respect to each other. No buffers are required in this system.

In the drawing, the object 3 can be any prosthesis part such as a tooth crown for example. Other prosthesis parts can be handled by the apparatus of the invention as will be apparent to those skilled in the art.

In carrying out the invention, the laser beam is focused by an optical lens system, not shown in the drawing, and therefore the shape of the device is conical to follow the laser beam geometry. Any suitable apparatus can be used to create the suction effect.

The materials of construction of the suction unit of the present invention are those commonly used in the art as shown in OLS 3,800,050 and German patent 3,923,829 both of which are relied on and incorporated by reference herein. Details of laser processing in the dental art are also well known as shown by the above mentioned documents and such procedures and techniques as are known in this art can be used according to the present invention, as will be apparent to those skilled in the art.

Further variations and modifications of the foregoing invention will be apparent to those skilled in the art and are intended to be encompassed by the claims appended hereto.

German priority application 197 34 294.9 is relied on and incorporated herein by reference.

We claim:

1. A suction system for removing gas and reaction products from a work area for laser processing of dental work pieces, comprising:

a conical laser focusing unit;

means for introducing a gas; and a first annular nozzle, concentrically surrounding the conical laser focusing unit, which first annular nozzle functions as a suction nozzle for the removal of gas and reaction products from the work area.

2. The suction system according to claim 1, wherein the means for introducing a gas is by way of the conical laser focusing unit.

3. The suction system according to claim 2, wherein a lower edge of the laser focusing unit extends beyond a lower edge of the first annular nozzle by 10–25 mm.

4. The suction system according to claim 1, wherein the means for introducing a gas is by way of a second annular nozzle, which is positioned between the conical laser focusing unit and the first annular nozzle, and which concentrically surrounds the conical laser focusing unit.

5. The suction system according to claim 4, wherein a lower edge of the second annular nozzle extends beyond a lower edge of the first annular nozzle by 10–25 mm.

6. The suction system according to claim 5, wherein cross-sectional dimensions of the first nozzle and of the second nozzle are between 8 and 11 mm.

* * * * *